Dec. 18, 1934.  C. M. LAFFOON ET AL  1,985,040
COOLING MEANS FOR CONDUCTORS
Filed Jan. 14, 1933   2 Sheets-Sheet 2

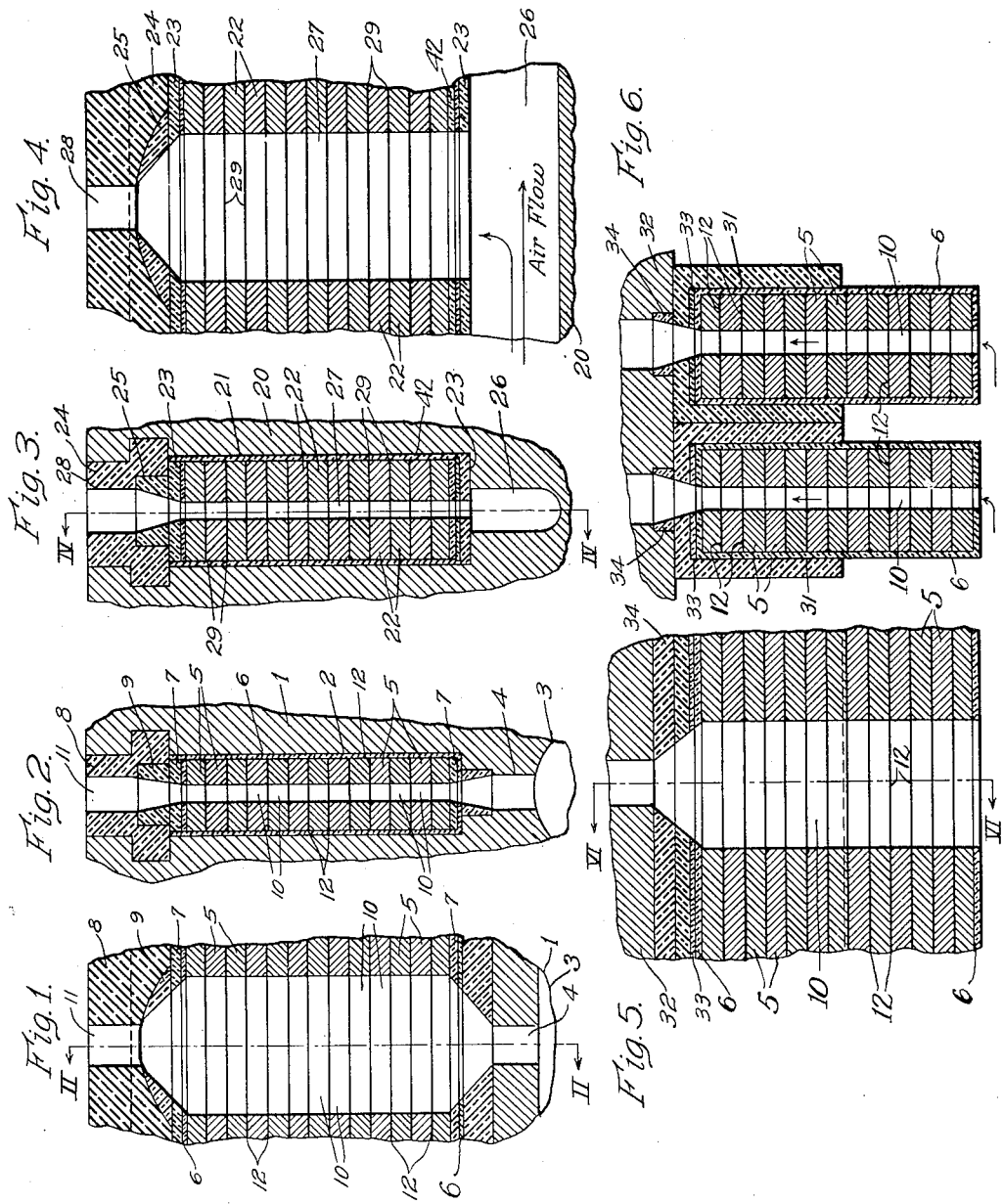

WITNESSES:
E. C. Riding
Paul E. Friedemann

INVENTORS.
Carthrae M. Laffoon and
Bennie A. Rose.
BY
W. R. Coley
ATTORNEY

Patented Dec. 18, 1934

1,985,040

UNITED STATES PATENT OFFICE 1,985,040

COOLING MEANS FOR CONDUCTORS

Carthrae M. Laffoon, Irwin, and Bennie A. Rose, Swissvale, Pa., assignors to Westinghouse Electric & Manufacturing Company, East Pittsburgh, Pa., a corporation of Pennsylvania Application January 14, 1933, Serial No. 651,660

10 Claims. (Cl. 171—252)

This invention relates to means for cooling electrical machinery, and more particularly to means for cooling the rotor of a turbo electric generator.

Conductors embedded in the slots of a turbo rotor are surrounded by a comparatively thick covering of insulating material. This material forms a very strong hindrance to the escape of heat to the outside and correspondingly reduces the efficiency of the machine. Hollow conductors have been proposed which increase the efficiency of the machine somewhat, but such conductors have not proved practical because of the increased resistance due to the smaller cross sectional area of the conductor and the greater cross-sectional slot area necessary.

Accordingly, one object of this invention is to provide cooling means for the conductors of a rotor which permit the cooling air to come in direct contact with the bare copper of the conductors.

Another object of this invention is to provide a novel cooling means for the conductors of a rotor which shall be simple in construction and economical to manufacture.

A further object of this invention is to reduce the temperature drop from the bare copper of a rotor conductor to the outside air.

A still further object of this invention is to increase the maximum output that can be obtained from a turbo generator with given physical dimensions.

A broad object of this invention is to increase the ampere turn rating of a rotor.

Other objects of this invention will become evident from the following detailed description, taken in conjunction with the accompanying drawings, in which:

Figure 1 is a fragmentary sectional view of a slot taken in a plane longitudinally of the slot of a part of an electric machine, such as the rotor of a turbo-generator, with conductors embedded therein according to this invention;

Fig. 2 is a fragmentary sectional view taken on line II—II of Fig. 1, i. e., at right angles to the section shown in Fig. 1;

Fig. 3 is a fragmentary sectional view taken similarly to Fig. 1 of a modification of the structure shown in Fig. 1;

Fig. 4 is a fragmentary sectional view taken on the line IV—IV of Fig. 3;

Fig. 5 shows a fragmentary sectional view taken longitudinally of the end winding of a rotor of a turbo-generator having cooling means provided therein according to this invention;

Fig. 6 is a fragmentary sectional view taken on the line VI—VI, i. e., at right angles to the showing in Fig. 5.

Figure 7:
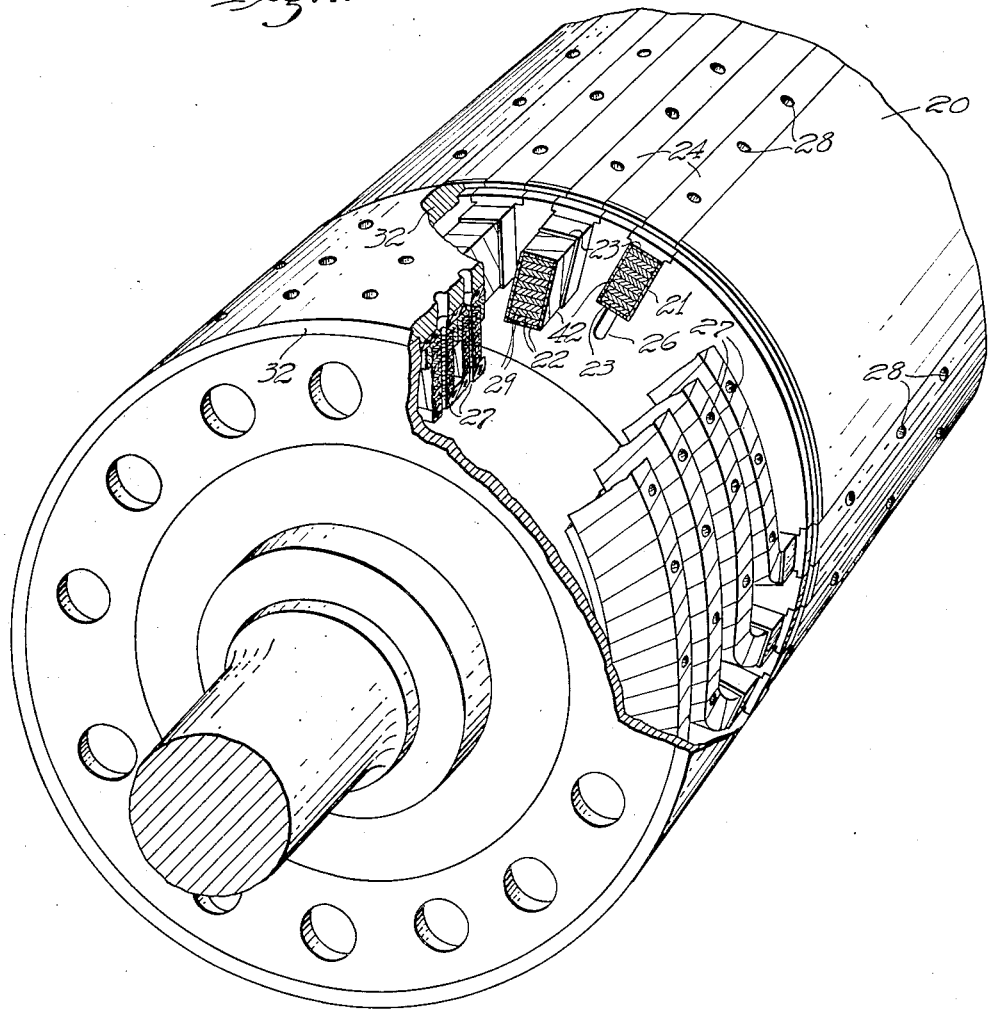
Fig. 7 is a perspective view of a two pole rotor of a turbo-generator illustrating the modification shown in Figs. 3 and 4 applied to the rotor.

Referring to the drawings, Figs. 1 and 2 show a rotor 1 (only a fragmentary view being shown) having slots 2 in the periphery thereof. Conduits 3 extend parallel to the axis of the rotor 1 and are connected to the slots 2 by radially extending passages 4. A plurality of conductors 5 of rectangular cross-section are disposed one upon the other in the slots 2 and insulated from each other by thin layers of insulation 12. An insulating wall or wrapping 6 surrounds all of the conductors 5 and added insulation 7 is provided at the top and bottom of the slots 2 in order to increase the creepage distance from the conductors 5 to the iron of the rotor 1. A wedge 8 of a suitable insulating material holds the conductors 5 in the slot 2 and extra insulation 9 is provided between the wedge 8 and the conductors 5.

The conductors 5 and the wedge 8 have aligned apertures 10 and 11, respectively, which extend radially from the spaced passages 4 and thus provide a cooling passage from the longitudinally extending conduits 3 to the outer periphery of the rotor 1. The longitudinally extending conduits 3 and the radially extending passages 4, 10 and 11 permit the air to pass from the central part of the rotor 1 through the conductors 5 and the wedge 8 to the outside. The apertures 10 within the conductors 5 may be rectangular or oblong and may be placed every six or eight inches apart. The apertures 11 are, however, circular so as not to weaken the wedge 8 too much. The insulation 9 provides the change from a rectangular to a circular section.

With the arrangement explained, practically all of the field copper losses would flow to the ducts and the temperature drop through the field coil insulation 6 and 7 would be eliminated. Furthermore, the temperature drop from the bare copper to the cooling air would be reduced since the duct dimensions can be proportioned to give a large cooling perimeter for a given area of section. In the arrangement shown, relatively large creepage distances are obtained, and there is no reduction in the slot space due to the addition of the insulation.

In Figs. 3 and 4, a rotor 20 is provided with slots 21 extending substantially longitudinally thereof. Conductors 22 insulated from each other by a thin layer of insulation 29 covering each conductor are disposed one upon the other in the slots 21 and are surrounded by an insulating wall or wrapping 42. An additional strip of insulation 23 is provided at the top and bottom of the slots 21 in order to increase the creepage distance from the conductors 22 to the iron of the rotor 20. A wedge 24 of suitable insulating material holds the conductors 22 in the slots 21 and extra insulation 25 is provided between the wedge 24 and the conductors 22. A slot 26 of less width than slot 21 is cut in the bottom of each slot 21. This slot 26 extends the full length of the armature and is open at the end and communicates with all the radial apertures 27. Ventilation for the conductors 22 is thus provided.

These rectangular or oblong apertures 27 provided in the conductors 22, for an average size generator, are spaced every six or eight inches apart along the conductors 22. The apertures 27 are aligned with circular apertures 28 provided in the wedges 24, thereby connecting the inner slot 26 with the outer periphery of the rotor 1. With this arrangement, air is drawn or forced into the inner slot 26 and passed out through the slots 27 and 28, carrying the heat from the conductors 22 with it.

The end windings of a turbo-generator rotor are shown in Figs. 5 and 6 and may be alike for both the modifications shown in Figs. 1 to 4, inclusive. The plurality of conductors 5 insulated from each other by insulation 12 are disposed in winding channels 31 held in place by a retaining ring 32. Insulation 33 is provided in the top of the winding channels 31 and all the conductors 5 are wrapped in the insulation 6. Insulation 34 is also provided between the retaining ring 32 and the winding channel 31. The apertures 10 extend through the conductors 5, the winding channel 31, and the retaining ring 32. Air passes through the apertures 10 to the outer periphery of the retaining ring 32 carrying the heat from the conductors 5 with it. The apertures 10 within the conductors 5 may be oblong or rectangular and are conveniently spaced to provide sufficient cooling area.

Although the foregoing description relates to certain specific embodiments, it is apparent that many modifications thereof are possible and may be devised by those skilled in the art after having studied this invention, the invention is, therefore, not to be restricted except insofar as is necessitated by the prior art and the spirit of the appended claims.

We claim as our invention:

1. In a rotor of a dynamo-electric machine having slots, conductors disposed in said slots, said conductors having apertures extending transversely through, and surrounded by the metal of, said conductors and spaced longitudinally thereof for cooling said conductors.

2. In a rotor of a turbo generator, slots extending substantially longitudinally of said rotor, and insulated conductors disposed in said slots, said conductors having small apertures extending transversely therethrough and spaced longitudinally thereof for cooling said conductors.

3. In a rotor of a turbo-generator having longitudinally extending conduits interiorly thereof, slots substantially parallel to said conduits in the periphery of said rotor, and conductors disposed within said slots, said conductors being pierced by transverse openings communicating with said conduits to provide vent passages from the interior of said rotor to the outer periphery thereof for cooling said conductors.

4. In a rotor of a turbo-generator having comparatively large slots in the periphery thereof and extending substantially longitudinally thereof and smaller slots formed in the bottom of said larger slots, and insulated conductors disposed in said peripheral slots, said conductors having small-diameter radial passages extending therethrough for providing vent openings from the smaller slots to the outer periphery of said rotor.

5. In a rotor of a turbo-generator having longitudinally extending conduits interiorly thereof, slots in the periphery of said rotor, a plurality of conductors disposed one upon the other within said slots, and wedges for retaining said conductors within said slots, said conductors and said wedges having apertures extending transversely therethrough to provide vent openings from said interior conduits of said rotor to the outer periphery thereof.

6. In combination with a turbo-generator rotor having longitudinally thereof slots, conductors disposed in said slots and extending around the ends of said rotor, said conductors having spaced small-diameter apertures extending transversely therethrough, and a retaining ring for holding said conductors extending around the ends of said rotor in place, said retaining ring having apertures aligned with the apertures in said conductors to permit air to pass therethrough.

7. A dynamo-electric machine rotor designed to receive a plurality of conductors in the periphery thereof, said conductors having spaced vent holes transverse thereof and surrounded by the metal of said conductors.

8. The combination of a slotted rotor of a dynamo-electric machine and a plurality of form-wound conductors insulated from each other and all wrapped in an insulating shield to form a coil, the shape of the coil being such as to fit in the rotor slots of a dynamo-electric machine, said conductors being pierced by aligned spaced vent openings transversely thereof and extending over the entire coil.

9. A conductor in combination with the rotor of a dynamo-electric machine, said conductor having small transverse vent openings spaced over the entire length of the conductor.

10. A rotor having longitudinal and radial vent openings communicating with each other, in combination, a conductor disposed on the rotor and pierced by transverse vent openings aligned with said radial vent openings whereby the conductor is effectively cooled when the rotor is rotating.

CARTHRAE M. LAFFOON.
BENNIE A. ROSE.